United States Patent
Hanson et al.

(10) Patent No.: US 11,377,069 B1
(45) Date of Patent: Jul. 5, 2022

(54) VEHICLE AUTHORIZATION MANAGEMENT

(71) Applicant: Ford Global Technologies, LLC, Dearborn, MI (US)

(72) Inventors: Ryan Edwin Hanson, Livonia, MI (US); Ali Hassani, Ann Arbor, MI (US); John Robert Van Wiemeersch, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/243,975

(22) Filed: Apr. 29, 2021

(51) Int. Cl.
| | | |
|---|---|---|
| H04N 5/44 | (2011.01) | |
| B60R 25/24 | (2013.01) | |
| H04W 4/021 | (2018.01) | |
| B60R 25/102 | (2013.01) | |
| B60K 28/10 | (2006.01) | |

(52) U.S. Cl.
CPC ............ *B60R 25/24* (2013.01); *B60R 25/102* (2013.01); *H04W 4/021* (2013.01); *B60K 28/10* (2013.01)

(58) Field of Classification Search
CPC ...... B60R 25/24; B60R 25/102; H04W 4/021; B60K 28/10
See application file for complete search history.

(56) References Cited

U.S. PATENT DOCUMENTS

| | | | | |
|---|---|---|---|---|
| 5,532,690 | A * | 7/1996 | Hertel | B60R 25/04 180/167 |
| 5,711,392 | A * | 1/1998 | Budel | B60R 25/04 180/287 |
| 9,275,208 | B2 | 3/2016 | Protopapas | |
| 9,509,775 | B2 | 11/2016 | Cuddihy et al. | |
| 10,293,787 | B2 | 5/2019 | Brombach et al. | |
| 2002/0163418 | A1* | 11/2002 | Nemoto | B60R 25/04 340/5.2 |
| 2006/0206261 | A1* | 9/2006 | Altaf | G01C 21/3626 701/533 |
| 2011/0193700 | A1* | 8/2011 | Fitzgibbon | E05F 15/73 340/541 |
| 2016/0055699 | A1 | 2/2016 | Vincenti | |
| 2019/0193682 | A1* | 6/2019 | Santiano | B60R 25/33 |
| 2019/0357005 | A1* | 11/2019 | Brady | G06Q 10/06314 |
| 2020/0371814 | A1* | 11/2020 | Kim | B60R 16/023 |
| 2021/0073841 | A1* | 3/2021 | Namiki | H02J 7/0047 |

OTHER PUBLICATIONS

"Managing User Profiles," XC40 Recharge Pure Electric, 2021, Change Car, Key, locks and alarm, Nov. 10, 2020, 2 pages.

\* cited by examiner

*Primary Examiner* — Munear T Akki
(74) *Attorney, Agent, or Firm* — Frank Lollo; Bejin Bieneman PLC

(57) ABSTRACT

A computer includes a processor and a memory storing instructions executable by the processor to receive an instruction to revoke an authorization for an operator to operate a vehicle; after receiving the instruction, permit the operator to operate the vehicle until the vehicle is turned off and a condition is met; and upon the vehicle being off and the condition being met, prevent the operator from operating the vehicle. The condition depends on a status of the vehicle.

21 Claims, 5 Drawing Sheets

VEHICLE AUTHORIZATION MANAGEMENT

BACKGROUND

Vehicles may determine whether someone attempting to operate the vehicle is an authorized operator based on possession of a key or keyfob. A lock, e.g., a pin-tumbler lock, of a vehicle checks whether the key has the corresponding series of teeth and notches on its blade. If so, the lock permits the vehicle to be started. A keyfob transmits a signal such as a radio frequency, an infrared signal, or a sound signal that can be recognized by the vehicle. If recognized, the vehicle can be started.

DETAILED DESCRIPTION

Figure 1:
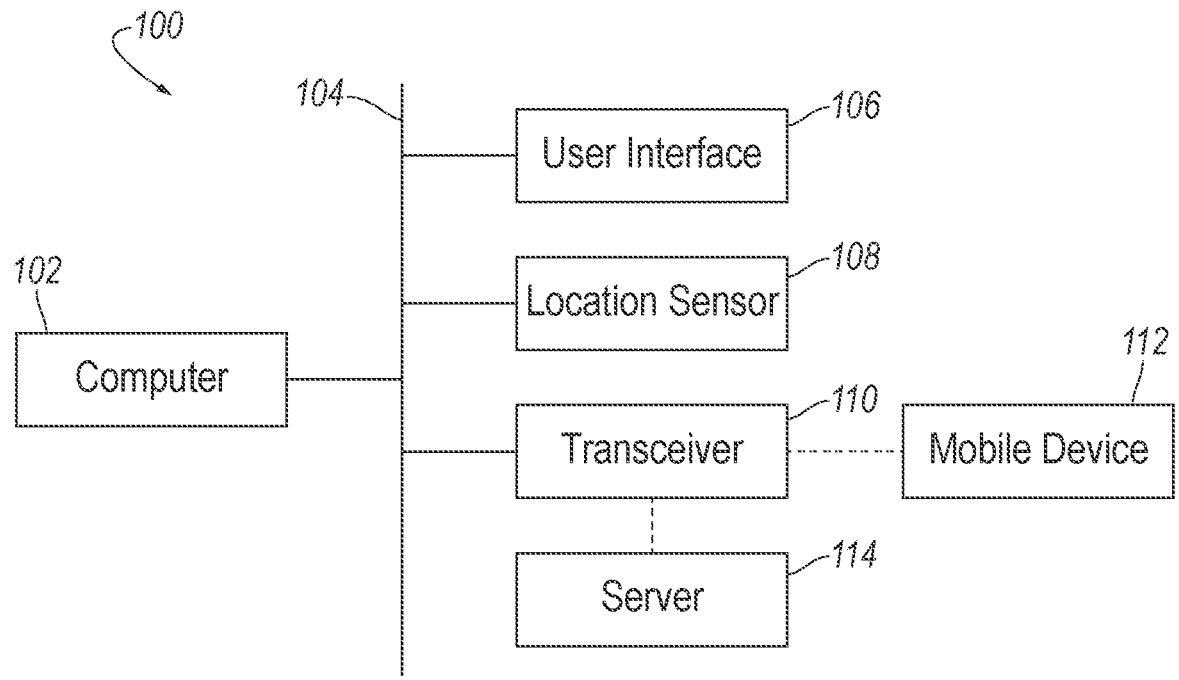
FIG. 1 is a block diagram of an example vehicle.

The system described herein dynamically and remotely controls a vehicle based on a status of an authorization of an operator of the vehicle. In some situations, an operator of a vehicle may have authorization to operate the vehicle for a limited time period, e.g., rentals, leases, etc. In such situations, the authorization of the operator to the vehicle may end at a prespecified time even though the operator has not yet surrendered the key or keyfob of the vehicle. In other words, the authorization of the operator is due to be revoked. "Revoke" and "revocation" mean that the operator is no longer permitted to operate the vehicle as had been authorized, e.g., the authorization is deleted or permissions in the authorization are modified. The vehicle can be remotely instructed that the authorization of the operator is revoked and that the key, keyfob, mobile device, near-field communication (NFC) card, code, etc. of that operator no longer grants the ability to access or operate the vehicle. The vehicle is remotely controlled to prevent the operator from operating the vehicle and possibly take other actions such as locking the vehicle.

Beneficially, the vehicle can be dynamically controlled to delay the revocation of the authorization until a condition is met, obviating the problem that the vehicle is mobile and thus may be in a poor position for the operator to surrender control. The condition depends on a status of the vehicle, for example, a number of ignition cycles; a location of the vehicle, e.g., inside a geofenced area; an expiration of a timer since the status of the vehicle changed, e.g., since the operator turned the vehicle off, since the operator left a vicinity of the vehicle, since the operator turned the vehicle off in a geofenced area; some combination of these conditions; etc. The system controls the vehicle according to data indicating a status of the authorization of the operator, which can be active if revocation is not due, pending revocation if revocation is due but being delayed until the condition is met, or revoked once the revocation is complete. For example, if the operator is taking the vehicle on a trip having a series of waypoints, then the condition may not be met until the operator has completed the waypoints, e.g., because the vehicle was not in a geofenced area, was not off until the timer expired while stopped at any of the waypoints, did not use up the number of ignition cycles, etc. The operator can complete the trip, and then the revocation of their authorization is completed. For another example, if the operator delivers the vehicle to a designated location to surrender control but the transportation that the operator was planning to use to leave is not available, then the condition may not be met, e.g., because the vehicle was not off until the timer expired, because the operator did not leave the vicinity of the vehicle, because the number of ignition cycles were not used up, etc. The operator can then retain authorization to operate the vehicle in order to leave the designated location. The system herein thus provides fine-tuned control of when the system controls the vehicle to prevent the operator from operating the vehicle, to lock the vehicle, etc.

A computer includes a processor and a memory storing instructions executable by the processor to receive an instruction to revoke an authorization for an operator to operate a vehicle; after receiving the instruction, permit the operator to operate the vehicle until the vehicle is turned off and a condition is met, the condition depending on a status of the vehicle; and upon the vehicle being off and the condition being met, prevent the operator from operating the vehicle.

The condition may include a location of the vehicle in a geofenced area.

The condition may include an expiration of a timer. The instructions may further include instructions to start the timer upon the operator leaving a predesignated area around the vehicle. The instructions may further include instructions to reset the timer upon the operator entering the predesignated area.

The instructions may further include instructions to start the timer upon turning off the vehicle in a geofenced area.

The condition may include an occurrence of at least one of a preset clock time or date after turning off the vehicle.

The condition may include a number of starts of the vehicle.

The instructions may further include instructions to, upon receiving the instruction to revoke the authorization, disable at least one feature of the vehicle.

The instructions may further include instructions to, after receiving an instruction to reinstate the authorization for the operator to operate the vehicle, permit the operator to operate the vehicle after the condition is met. The instruction to reinstate the authorization may include a future time at which to receive the instruction to revoke the authorization.

The instructions may further include instructions to, upon receiving an input from the operator, prevent the operator from operating the vehicle. The instructions may include instructions to, upon receiving the input from the operator, transmit a notification to a remote server, the notification including a timestamp.

The instructions may further include instructions to, upon receiving the instruction to revoke the authorization, output a notification to the operator. Outputting the notification to the operator may include instructing a user interface of the vehicle to display a message.

Outputting the notification to the operator may include transmitting the notification to a mobile device of the operator.

The instructions may further include instructions to, upon the vehicle being off and the condition being met, lock the vehicle.

A system includes a server remote from a vehicle programmed to, at a prespecified time, transmit an instruction to the vehicle to revoke an authorization for an operator to operate the vehicle; and a computer programmed to, after receiving the instruction from the server, permit the operator to operate the vehicle until the vehicle is turned off and a condition is met, the condition depending on a status of the vehicle; and upon the vehicle being off and the condition being met, prevent the operator from operating the vehicle.

The server may be further programmed to, after the prespecified time, upon receiving an input including a second prespecified time, transmit an instruction to the vehicle to reinstate the authorization of the operator to operate the vehicle; and at the second prespecified time, transmit a second instruction to the vehicle to revoke the authorization.

A method includes receiving an instruction to revoke an authorization for an operator to operate a vehicle; after receiving the instruction, permitting the operator to operate the vehicle until the vehicle is turned off and a condition is met, the condition depending on a status of the vehicle; and upon the vehicle being off and the condition being met, preventing the operator from operating the vehicle.

With reference to the Figures, wherein like numerals indicate like parts throughout the several views, a computer 102 includes a processor and a memory storing instructions executable by the processor to receive an instruction to revoke an authorization for an operator to operate a vehicle 100; after receiving the instruction, permit the operator to operate the vehicle 100 until the vehicle 100 is turned off and a condition is met; and upon the vehicle 100 being off and the condition being met, prevent the operator from operating the vehicle 100. The condition depends on a status of the vehicle 100.

With reference to FIG. 1, the vehicle 100 may be any passenger or commercial automobile such as a car, a truck, a sport utility vehicle, a crossover, a van, a minivan, a taxi, a bus, etc. The vehicle 100 can be an internal-combustion engine vehicle, a battery-electric vehicle (BEV), a hybrid-electric vehicle, a plug-in hybrid-electric vehicle (PHEV), etc. The vehicle 100 can be autonomous, semi-autonomous, or nonautonomous.

The computer 102 is a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The computer 102 can thus include a processor, a memory, etc. The memory of the computer 102 can include media for storing instructions executable by the processor as well as for electronically storing data and/or databases, and/or the computer 102 can include structures such as the foregoing by which programming is provided. The computer 102 can be multiple computers coupled together.

The computer 102 may transmit and receive data through a communications network 104 such as a controller area network (CAN) bus, Ethernet, WiFi, Local Interconnect Network (LIN), onboard diagnostics connector (OBD-II), and/or by any other wired or wireless communications network. The computer 102 may be communicatively coupled to a user interface 106, a location sensor 108, a transceiver 110, and other components via the communications network 104.

The user interface 106 presents information to and receives information from an occupant of the vehicle 100. The user interface 106 may be located, e.g., on an instrument panel in a passenger cabin of the vehicle 100, or wherever the user interface 106 may be readily seen by the operator. The user interface 106 may include dials, digital readouts, screens, speakers, and so on for providing information to the operator, e.g., human-machine interface (HMI) elements such as are known. The user interface 106 may include buttons, knobs, keypads, microphone, and so on for receiving information from the operator.

The location sensor 108 provides data specifying a location of the vehicle 100. For example, the location sensor 108 can be a GPS sensor. A GPS sensor receives data from GPS satellites. The Global Positioning System (GPS) is a global navigation satellite system. The satellites broadcast time and geolocation data. The GPS sensor can determine a location of the vehicle 100, i.e., latitude and longitude, based on receiving the time and geolocation data from multiple satellites simultaneously. For another example, the location sensor 108 can receive data transmitted by local transmitters, e.g., specifying a location or from which the location sensor 108 can triangulate a location. For yet another example, the location sensor 108 can include multiple on-board sensors such as a three-axis accelerometer and a steering-wheel sensor that provide data for tracking the location of the vehicle 100 using dead-reckoning methods.

The transceiver 110 may be adapted to transmit signals wirelessly through any suitable wireless communication protocol for a nearby device, such as cellular, Bluetooth®, Bluetooth® Low Energy (BLE), ultra-wideband (UWB), WiFi, IEEE 802.11a/b/g/p, cellular-V2X (CV2X), Dedicated Short-Range Communications (DSRC), other RF (radio frequency) communications, etc. The transceiver 110 may be adapted to communicate with remote servers, that is, servers distinct and spaced from the vehicle 100. The remote servers may be located outside the vehicle 100. For example, the remote servers may be a mobile device 112 associated with the owner of the vehicle 100, a server 114 managing a fleet including the vehicle 100, another vehicle (e.g., V2V communications), an infrastructure component (e.g., V2I communications), an emergency responder, etc. The transceiver 110 may be one device or may include a separate transmitter and receiver.

Figure 2:
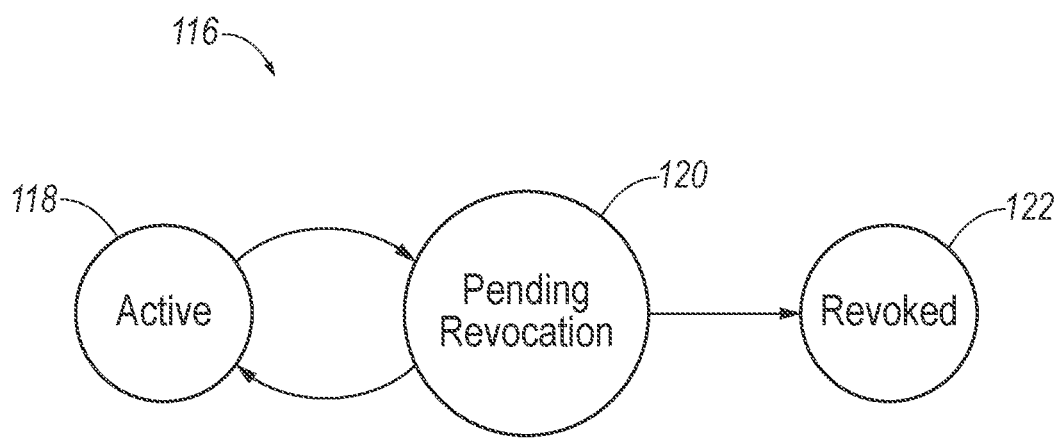
FIG. 2 is a network graph of example states of an authorization for an operator of the vehicle.

With reference to FIG. 2, the authorization of the operator is in one of a plurality of states 116. The state 116 is stored in the memory of the computer 102 of the vehicle 100 as well as the memory of the server 114. The operator can be linked to the state 116 of their authorization via a physical key, a keyfob, an NFC card, the mobile device 112, a code, a biometric identifier like fingerprint or facial recognition, etc. The states 116 can include an active state 118, a pending-revocation state 120, and a revoked state 122, as well as possibly other states 116.

The active state 118 means that the operator has permission to operate the vehicle 100 and will continue to have permission to operate the vehicle 100 even if the conditions described below are met. The permission to operate the vehicle 100 can be indefinite or can have a prespecified time in the future to terminate. When the authorization is in the active state 118, some features of the vehicle 100 are enabled. These same features are disabled when the authorization is in the pending-revocation state 120.

The pending-revocation state 120 means that the operator has permission to operate the vehicle 100 until the conditions described below are met. For example, the permission to operate the vehicle 100 can have a prespecified time in the past to terminate, and revocation of that permission is delayed until the condition is met, as described below. When the authorization is in the pending-revocation state 120, some features of the vehicle 100 can be disabled that would be enabled when the authorization is in the active state 118. For example, one or more audio features of the user interface 106 are disabled, e.g., radio and/or other media inputs. Whether features of the vehicle 100 are disabled can be configured by an administrator.

The revoked state 122 means that the operator no longer has permission to operate the vehicle 100, e.g., because the conditions described below have been met. For example, a value of the authorization is set to revoked in the memory of the computer 102. For another example, the authorization is deleted from the vehicle 100.

The authorization can transition between the states 116 based on various data thresholds or conditions being met. For example, the authorization can transition from the active state 118 to the pending-revocation state 120 because a prespecified time to terminate the permission to operate the vehicle 100 occurred or because of an agreement by the operator. For another example, the authorization can transition from the pending-revocation state 120 to the active state 118 because the operator or a vehicle provider renews the authorization or because the prespecified time to terminate the permission to operate the vehicle 100 is moved to a point in the future. For another example, the authorization can transition from the pending-revocation state 120 to the revoked state 122 because one or more of conditions, such as discussed below, occur.

Below are examples of the conditions for transitioning from the pending-revocation state 120 to the revoked state 122. The conditions depend on a status of the vehicle 100, e.g., ignition cycles of the vehicle 100, a location of the vehicle 100, a time since a change in status of the vehicle 100, a location of the operator relative to the vehicle 100, etc. In addition to the conditions below, the transition from the pending-revocation state 120 to the revoked state 122 occurs only if the vehicle 100 is turned off. The transition thus does not interfere with operation of the vehicle 100 or risk stranding the operator. The computer 102 can be programmed with one of these conditions, more than one of these conditions, a combination of these conditions, and/or other conditions depending on the status of the vehicle 100. Which conditions are programmed in the computer 102 can be chosen based on, e.g., surveying consumer preferences.

As a first example, the condition can include a number of starts of the vehicle 100, e.g., ignition cycles. The number of starts can be, e.g., a number of motive starts. For the purposes of this disclosure, a "motive start" is defined as a start selected by the operator that follows a turnoff selected by the operator. Nonmotive starts can include, e.g., restarting the vehicle 100 after the vehicle 100 turned itself off due to inactivity. Alternatively, the number of starts can be a number of motive and nonmotive starts. For example, the condition can be that the number of motive starts or all starts since the authorization transitioned to the pending-revocation state 120 is less than a threshold number. The threshold number can be chosen based on a typical upper limit of motive starts for the operator to deliver the vehicle 100 to a designated location to surrender the vehicle 100.

As a second example, the condition can include expiration of a timer. The timer can be implemented using a clock functionality of the computer 102. The duration of the timer can be chosen based on a typical time for the operator to survey the surroundings of the vehicle 100 and change their mind about surrendering the vehicle 100. The timer can be set to start upon turning the vehicle 100 off. Alternatively or additionally, the timer can be set to start upon turning off the vehicle 100 in a geofenced area 124 or upon the operator leaving a predesignated area 126, as described in more detail below. The timer can reset if the timer does not expire before the starting condition of the timer becomes no longer true, for example, if the timer does not expire before the vehicle 100 is started, the vehicle 100 leaves the geofenced area 124, or the operator returns to the predesignated area 126, depending on the starting condition of the timer.

As a third example, the condition can include an occurrence of at least one of a preset clock time or date after turning off the vehicle 100. The occurrence of the clock time can be absolute, e.g., at the first 6:00 PM local time that occurs after turning off the vehicle 100, or relative, e.g., at the beginning of the hour at least two hours after turning off the vehicle, such as at 5:00 PM after turning of the vehicle 100 at 2:37 PM. The occurrence of the date can also be absolute, e.g., April 7, or relative, the beginning of the next day after the vehicle 100 is turned off. The preset clock time and/or date can be chosen based on applying a safety factor to a scheduled dropoff time and/or date. Alternatively or additionally, the occurrence of the preset clock time and/or date can occur after turning off the vehicle 100 in the geofenced area 124.

Figure 3:
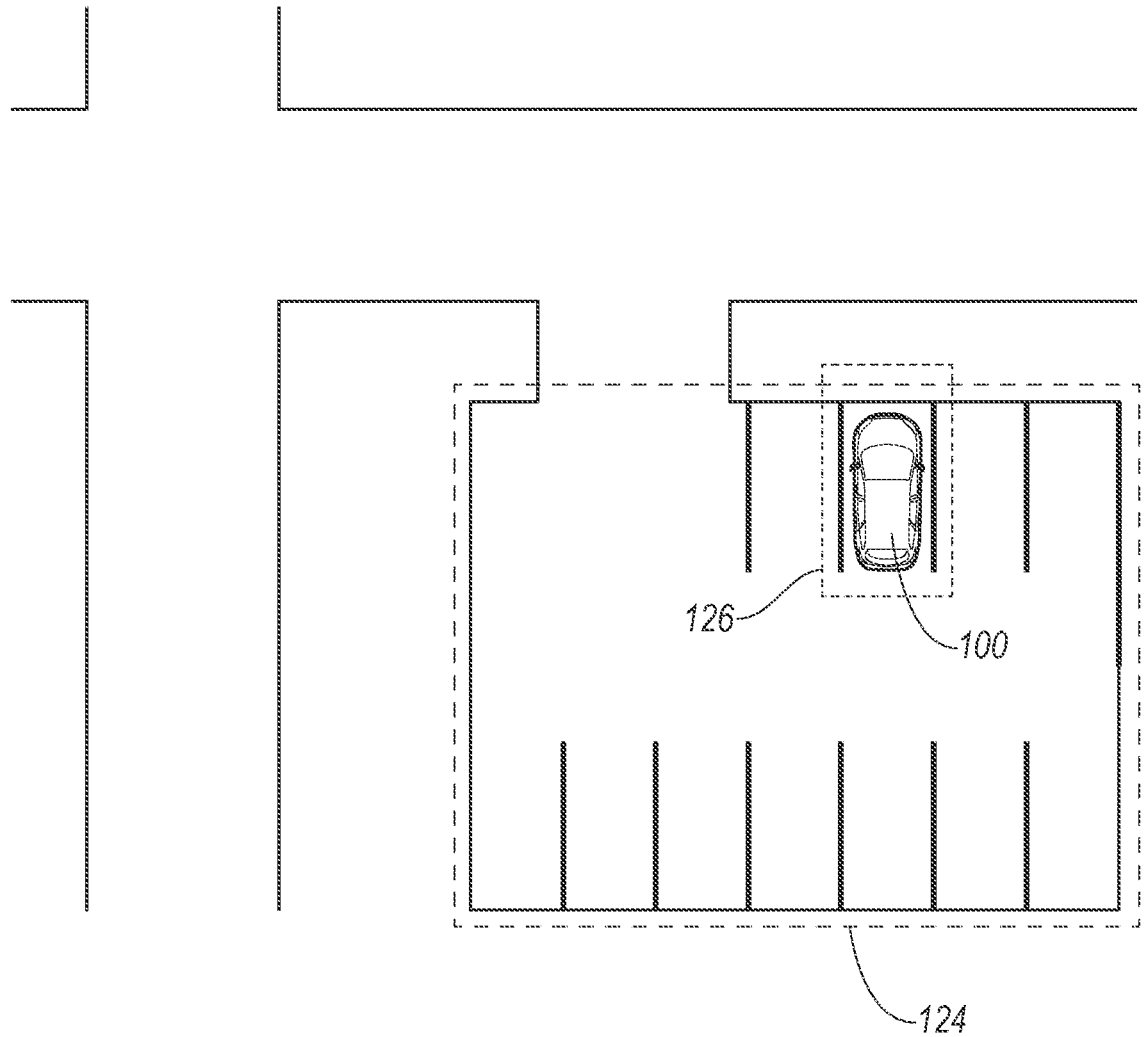
FIG. 3 is a diagrammatic view of the vehicle in an example geofenced area.

With reference to FIG. 3, as a fourth example, the condition can include a location of the vehicle 100 in a geofenced area 124. For the purposes of this disclosure, a "geofenced area" is defined as a geographical area with defined virtual boundaries. The boundaries can be stored in the memory of the computer 102. The computer 102 can determine that the vehicle 100 is in the geofenced area 124 based on data received from the location sensor 108 compared with the boundaries stored in memory. The geofenced area 124 can be chosen to encompass a designated location for surrendering the vehicle 100, e.g., a specific parking lot as shown in FIG. 3. For example, the condition can be that the vehicle 100 is turned off while inside the geofenced area 124.

As a fifth example, the condition can be a combination of the timer and the location. For example, the timer can start upon turning off the vehicle 100 in the geofenced area 124. The timer does not start if the vehicle 100 is turned off outside the geofenced area 124 or the vehicle 100 is still running while inside the geofenced area 124.

As a sixth example, the condition can be a location of the operator relative to the vehicle 100, e.g., the operator leaving a predesignated area 126 around the vehicle 100. The predesignated area 126 is a bounded area with boundaries defined relative to the vehicle 100. The predesignated area 126 can be chosen to encompass where a typical operator would understand as close to the vehicle 100, based on surveying operators.

Figure 4:
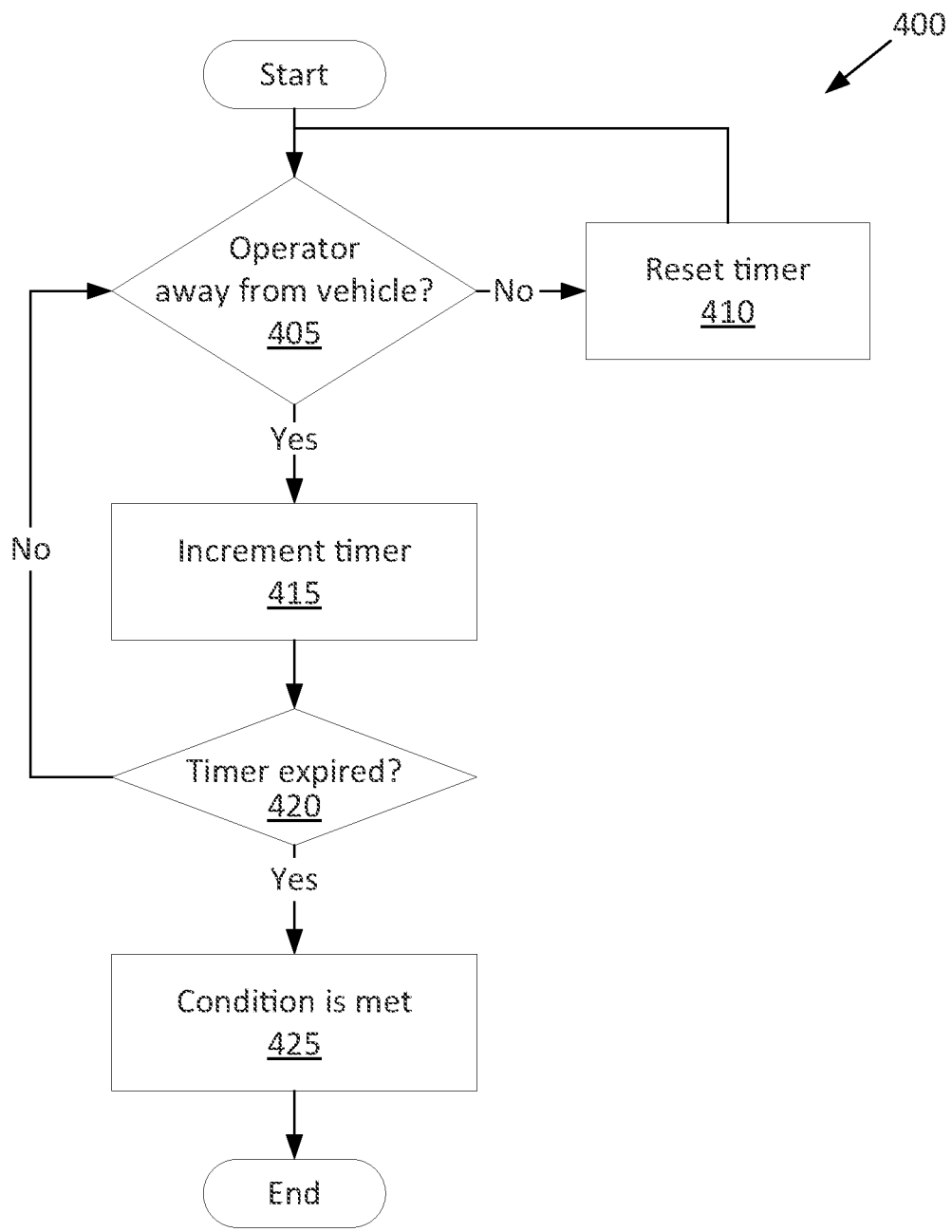
FIG. 4 is a process flow diagram of an example process for determining whether a condition has been met for revoking the authorization.

As a seventh example, with reference to FIG. 4, the condition can be a combination of the location of the operator relative to the predesignated area 126 and the timer. FIG. 4 is a process flow diagram illustrating an exemplary process 400 for determining whether the condition has been met, specifically the condition of the timer expiring after the operator has left the predesignated area 126 around the vehicle 100. The memory of the computer 102 stores executable instructions for performing the steps of the process 400 and/or programming can be implemented in structures such as mentioned above. As a general overview of the process 400, the computer 102 can start the timer upon the operator leaving the predesignated area 126 and continue incrementing the timer while the operator stays outside the predesignated area 126. If the operator enters the predesignated area 126 before the timer expires, the computer 102 resets the timer. If the timer expires, then the condition is set as being met.

The process 400 begins in a decision block 405, in which the computer 102 determines whether the operator is outside the predesignated area 126, i.e., has left and not reentered the predesignated area 126. For example, the computer 102 can determine a distance of the operator from the vehicle 100 based on a strength of signal of the mobile device 112 to the transceiver 110, e.g., based on whether the strength of signal is above a signal-strength threshold. The signal strength decays at a known quantity versus distance, and the signal-strength threshold can be chosen to correspond to the predesignated area 126. Upon the operator leaving and continuing to be outside the predesignated area 126, the process 400 proceeds to a block 415. Upon the operator being within or entering the predesignated area 126, the process 400 proceeds to a block 410.

In the block 410, the computer 102 resets the timer, i.e., instructs the timer to restart its countdown. After the block 410, the process 400 returns to the decision block 405 to continue monitoring the location of the operator relative to the vehicle 100.

In the block 415, the computer 102 increments the timer, either starting the countdown of the timer if the timer was just reset or continuing the countdown of the timer.

Next, in a decision block 420, the computer 102 determines if the timer has expired. If the timer has not expired, the process 400 returns to the decision block 405 to continue monitoring the location of the operator relative to the vehicle 100. If the timer has expired, the process 400 proceeds to a block 425.

In the block 425, the computer 102 sets that the condition is met. The authorization can thus transition from the pending-revocation state 120 to the revoked state 122. After the block 425, the process 400 ends.

Figure 5:
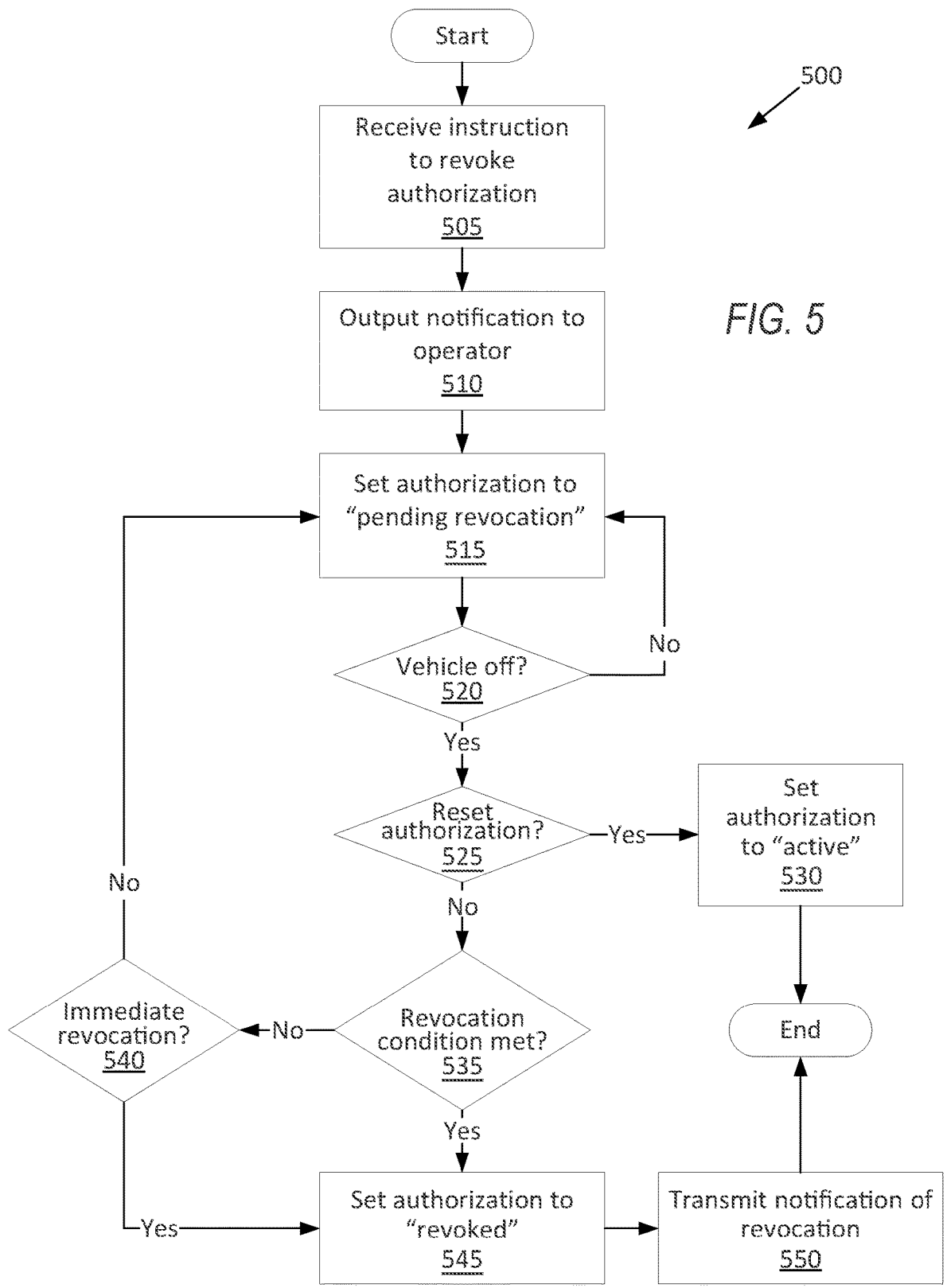
FIG. 5 is a process flow diagram of an example process for the vehicle to revoke the authorization.

FIG. 5 is a process flow diagram illustrating an exemplary process 500 for revoking the authorization on the computer 102. The memory of the computer 102 stores executable instructions for performing the steps of the process 500 and/or programming can be implemented in structures such as mentioned above. As a general overview of the process 500, the computer 102 receives an instruction from the server 114 to revoke the authorization, outputs a notification to the operator, and sets the authorization to the pending-revocation state 120. Once the vehicle 100 is turned off, the computer 102 determines whether the computer 102 has received an instruction to reinstate the authorization and, if so, sets the authorization to the active state 118. If not, then if either the condition is met (as described above) or the computer 102 receives an input from the operator to immediately revoke the authorization, the computer 102 sets the authorization to the revoked state 122 and transmits a notification to the server 114.

The process 500 begins in a block 505, in which the computer 102 receives an instruction to revoke the authorization for the operator, e.g., from the server 114 via the transceiver 110. The instruction may include, e.g., a reason for revocation, a prespecified time to terminate the authorization, instructions for the operator to reactivate the authorization, etc. The computer 102 can also have stored the instruction to revoke the authorization until a second prespecified time, e.g., if the operator opted to reinstate the authorization in the decision block 525 below at a previous time.

Next, in a block 510, the computer 102 outputs a notification to the operator. Outputting the notification can include instructing the user interface 106 to display a message, e.g., stating that the authorization has transitioned to the pending-revocation state 120. The message may also include the information included in the instruction received in the block 505. The message may provide an option for the operator to reactivate the authorization. Alternatively or additionally, outputting the notification can include transmitting the notification to the mobile device 112 via the transceiver 110. The mobile device 112 can display a message including the same information as the message displayed by the user interface 106. The operator is thus notified even if they have recently left the vehicle 100.

Next, in a block 515, the computer 102 transitions the authorization to the pending-revocation state 120. As described above, the computer 102 still permits the operator to operate the vehicle 100 while the authorization is in the pending-revocation state 120, and the computer 102 may disable some features of the vehicle 100.

Next, in a decision block 520, the computer 102 determines whether the vehicle 100 is off. Whether the vehicle 100 is off can be limited to a motive turnoff. For the purposes of this disclosure, a "motive turnoff" is defined as a turnoff selected by the operator. If the vehicle 100 is still on, the process 500 returns to the block 515 to continue operating with the authorization in the pending-revocation state 120 until the vehicle 100 is turned off. If the vehicle 100 has been turned off or is already off, the process 500 proceeds to a decision block 525.

In the decision block 525, the computer 102 determines whether the computer 102 received an instruction to reinstate the authorization, e.g., by the operator selecting the option to do so in the message displayed in the block 510 above. The computer 102 can receive the instruction to reinstate by the operator inputting the instruction in the user interface 106. Alternatively or additionally, the operator can input into the mobile device 112, which transmits to the server 114, and the server 114 can transmit the instruction to reinstate to the computer 102 via the transceiver 110. The instruction to reinstate the authorization can include a future time, i.e., a second prespecified time, at which to receive the instruction to revoke the authorization. Upon receiving the instruction to reinstate the authorization, the process 500 proceeds to a block 530. If the computer 102 has not received the instruction to reinstate the authorization, the process 500 proceeds to a decision block 535.

In the block 530, the computer 102 transitions the authorization from the pending-revocation state 120 to the active state 118. The computer 102 thus permits the operator to operate the vehicle 100 even if the condition is met as described above. After the block 530, the process 500 ends.

In the decision block 535, the computer 102 determines whether the condition is met, according to whichever of the examples above is programmed in the computer 102. If the condition is not yet met, the process 500 proceeds to a decision block 540. Upon the condition being met, the process 500 proceeds to a block 545.

In the decision block 540, the computer 102 determines whether the computer 102 has received an input from the operator requesting immediate revocation, i.e., transition of the authorization to the revoked state 122 even though the condition is not yet met. The computer 102 can receive the input by the operator providing the input to the user interface 106. Alternatively or additionally, the operator can provide the input to the mobile device 112, which transmits to the server 114, and the server 114 can transmit the input to immediately revoke to the computer 102 via the transceiver 110. If the computer 102 has not received the input to revoke the authorization, the process 500 returns to the block 515 to continue operating with the authorization in the pending-revocation state 120 until the condition is met. Upon receiving the input from the operator, the process 500 proceeds to the block 545.

In the block 545, the computer 102 transitions the authorization from the pending-revocation state 120 to the revoked state 122. The computer 102 thus prevents the operator from operating the vehicle 100. The computer 102 also locks the vehicle 100 to prevent reentry by the operator or entry by anyone else unauthorized.

Next, in a block 550, the computer 102 transmits a notification to the server 114 via the transceiver 110 that the authorization has transitioned from the pending-revocation state 120 to the revoked state 122. The notification can include a timestamp of when the transition occurred. The timestamp can be used to give credit to the operator for immediate revocation in the decision block 540, e.g., if the operator is being billed until the authorization is revoked. After the block 550, the process 500 ends.

Figure 6:
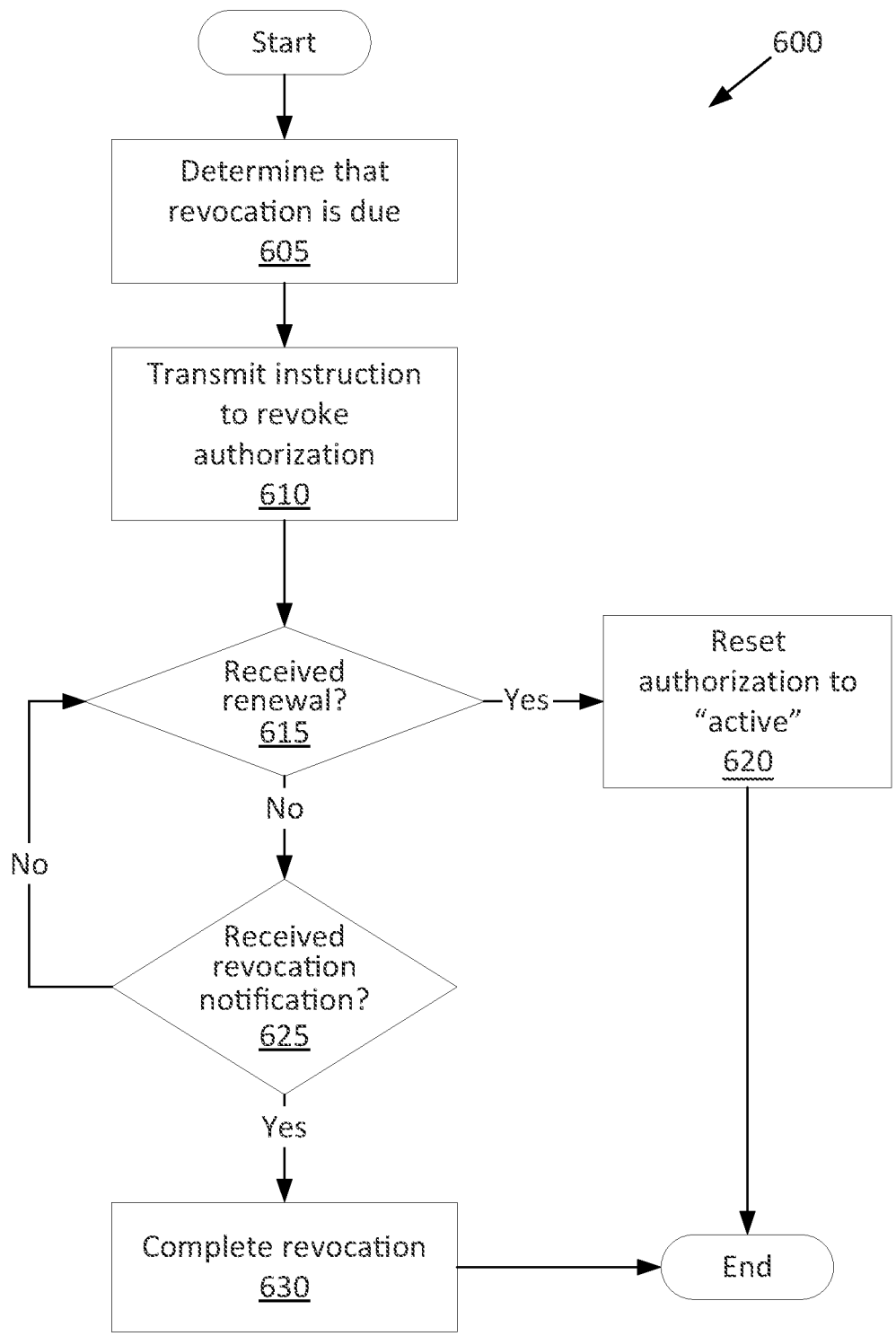
FIG. 6 is a process flow diagram of an example process for a server to revoke the authorization.

FIG. 6 is a process flow diagram illustrating an exemplary process 600 for revoking the authorization on the server 114. The memory of the server 114 stores executable instructions for performing the steps of the process 600 and/or programming can be implemented in structures such as mentioned above. As a general overview of the process 600, the server 114 determines that the authorization is due to be revoked and transmits an instruction to the computer 102 on board the vehicle 100 to revoke the authorization. If the server 114 receives an input to reinstate the authorization, the server 114 transitions the authorization from the pending-revocation state 120 to the active state 118 and transmits an instruction to the vehicle 100 to reinstate the authorization. If the server 114 receives a notification from the vehicle 100 that the authorization has transitioned from the pending-revocation state 120 to the revoked state 122 as stored on the computer 102 of the vehicle 100, the server 114 transitions the authorization to the revoked state 122 as stored on the server 114.

The process 600 begins in a block 605, in which the server 114 determines whether revocation of the authorization is due. For example, the server 114 can determine that a prespecified time has arrived. The prespecified time can be a time agreed-upon by the operator that the authorization will be revoked. Alternatively or additionally, the server 114 can determine that some other agreed-upon prespecified occurrence has occurred for revoking the authorization. The server 114 transitions the authorization from the active state 118 to the pending-revocation state 120, as stored on the server 114.

Next, in a block 610, the server 114 transmits an instruction to the vehicle 100 to revoke the authorization, which the computer 102 of the vehicle 100 receives in the block 505 above.

Next, in a decision block 615, the server 114 determines whether the server 114 has received the input to reinstate the authorization, either from the vehicle 100 as inputted to the user interface 106 or from the mobile device 112 of the operator, as described above with respect to the decision block 525. The input can include a second prespecified time at which the authorization will be revoked, i.e., the operator is extending a time for which they have permission to operate the vehicle 100. Upon receiving the input to reinstate the authorization, the process 600 proceeds to a block 620. If the server 114 has not received the input to reinstate the authorization, the process 600 proceeds to a decision block 625.

In the block 620, the server 114 transitions the authorization from the pending-revocation state 120 to the active state 118, as stored on the server 114. The server 114 transmits an instruction to the vehicle 100 to reinstate the authorization, which the computer 102 on board the vehicle 100 receives in the decision block 525 above and transitions the authorization from the pending-revocation state 120 to the active state 118 as stored on the computer 102 in the block 530 above. When the server 114 runs the process 600 again at the second prespecified time contained in the input, the server 114 will then transmit a second instruction to the vehicle 100 to revoke the authorization. After the block 620, the process 600 ends.

In the decision block 625, the server 114 determines whether the server 114 has received the input from the operator requesting immediate revocation from the mobile device 112 of the operator, as described above with respect to the decision block 540, and/or has received the notification of revocation from the computer 102 on board the vehicle 100, as described above with respect to the block 550. If the server 114 has not received either indication that the authorization has transitioned to the revoked state 122, the process 600 returns to the decision block 615 to continue awaiting information about transitioning the authorization out of the pending-revocation state 120. Upon receiving either indication that the authorization has transitioned to the revoked state 122, the process 600 proceeds to a block 630.

In the block 630, the server 114 transitions the authorization from the pending-revocation state 120 to the revoked state 122, as stored on the server 114. If the server 114 received the input requesting immediate revocation from the mobile device 112 of the operator, the server 114 transmits an instruction to the vehicle 100 to immediately transition the authorization to the revoked state 122, which is received by the computer 102 on board the vehicle 100 in the decision block 540 above. After the block 630, the process 600 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server 114, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. Use of "in response to" and "upon determining" indicates a causal relationship, not merely a temporal relationship. The adjectives "first" and "second" are used throughout this document as identifiers and are not intended to signify importance, order, or quantity.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A computer comprising a processor and a memory storing instructions executable by the processor to:
   receive an instruction to revoke an authorization for an operator to operate a vehicle;
   after receiving the instruction, permit the operator to operate the vehicle until the operator manually switches off an ignition of the vehicle and a condition is met, the condition depending on a status of the vehicle;
   upon the ignition being switched off by the operator and the condition being met, prevent the operator from operating the vehicle; and
   upon receiving an input from the operator, prevent the operator from operating the vehicle.

2. The computer of claim 1, wherein the condition includes a location of the vehicle in a geofenced area.

3. The computer of claim 1, wherein the condition includes an expiration of a timer.

4. The computer of claim 3, wherein the instructions further include instructions to start the timer upon the operator leaving a predesignated area around the vehicle.

5. The computer of claim 4, wherein the instructions further include instructions to reset the timer upon the operator entering the predesignated area.

6. The computer of claim 3, wherein the instructions further include instructions to start the timer upon the ignition being switched off in a geofenced area.

7. The computer of claim 1, wherein the condition includes an occurrence of at least one of a preset clock time or date after the ignition being switched off.

8. The computer of claim 1, wherein the condition includes a number of starts of the vehicle.

9. The computer of claim 1, wherein the instructions further include instructions to, upon receiving the instruction to revoke the authorization, disable at least one feature of the vehicle.

10. The computer of claim 1, wherein the instructions further include instructions to, after receiving an instruction to reinstate the authorization for the operator to operate the vehicle, permit the operator to operate the vehicle after the condition is met.

11. The computer of claim 10, wherein the instruction to reinstate the authorization includes a future time at which to receive the instruction to revoke the authorization.

12. The computer of claim 1, wherein the instructions includes instructions to, upon receiving the input from the operator, transmit a notification to a remote server, the notification including a timestamp.

13. The computer of claim 1, wherein the instructions further include instructions to, upon receiving the instruction to revoke the authorization, output a notification to the operator.

14. The computer of claim 13, wherein outputting the notification to the operator includes instructing a user interface of the vehicle to display a message.

15. The computer of claim 13, wherein outputting the notification to the operator includes transmitting the notification to a mobile device of the operator.

16. The computer of claim 1, wherein the instructions further include instructions to, upon the ignition being switched off by the operator and the condition being met, lock the vehicle.

17. A system comprising:
a server remote from a vehicle programmed to:
at a prespecified time, transmit an instruction to the vehicle to revoke an authorization for an operator to operate the vehicle;
after the prespecified time, upon receiving an input including a second prespecified time, transmit an instruction to the vehicle to reinstate the authorization of the operator to operate the vehicle; and
at the second prespecified time, transmit a second instruction to the vehicle to revoke the authorization; and
a computer programmed to:
after receiving the instruction from the server, permit the operator to operate the vehicle until the operator manually switches off an ignition of the vehicle and a condition is met, the condition depending on a status of the vehicle; and
upon the ignition being switched off by the operator and the condition being met, prevent the operator from operating the vehicle.

18. A method comprising:
receiving an instruction to revoke an authorization for an operator to operate a vehicle;
after receiving the instruction, permitting the operator to operate the vehicle until the operator manually switches off an ignition of the vehicle and a condition is met, the condition depending on a status of the vehicle;
upon the ignition being switched off by the operator and the condition being met, preventing the operator from operating the vehicle; and
upon receiving an input from the operator, preventing the operator from operating the vehicle.

19. A computer comprising a processor and a memory storing instructions executable by the processor to:
receive an instruction to revoke an authorization for an operator to operate a vehicle;
after receiving the instruction, permit the operator to operate the vehicle until the operator manually switches off an ignition of the vehicle and a condition is met, the condition depending on a status of the vehicle, the condition including an expiration of a timer;
upon the ignition being switched off by the operator and the condition being met, prevent the operator from operating the vehicle;
start the timer upon the operator leaving a predesignated area around the vehicle; and
reset the timer upon the operator entering the predesignated area.

20. A computer comprising a processor and a memory storing instructions executable by the processor to:
receive an instruction to revoke an authorization for an operator to operate a vehicle;
after receiving the instruction, permit the operator to operate the vehicle until the operator manually switches off an ignition of the vehicle and a condition is met, the condition depending on a status of the vehicle, the condition including a number of starts of the vehicle; and
upon the ignition being switched off by the operator and the condition being met, prevent the operator from operating the vehicle.

21. A computer comprising a processor and a memory storing instructions executable by the processor to:
receive an instruction to revoke an authorization for an operator to operate a vehicle;
after receiving the instruction, permit the operator to operate the vehicle until the operator manually switches off an ignition of the vehicle and a condition is met, the condition depending on a status of the vehicle;
upon the ignition being switched off by the operator and the condition being met, prevent the operator from operating the vehicle; and
after receiving an instruction to reinstate the authorization for the operator to operate the vehicle, permit the operator to operate the vehicle after the condition is met.

* * * * *